United States Patent Office 3,266,339
Patented August 16, 1966

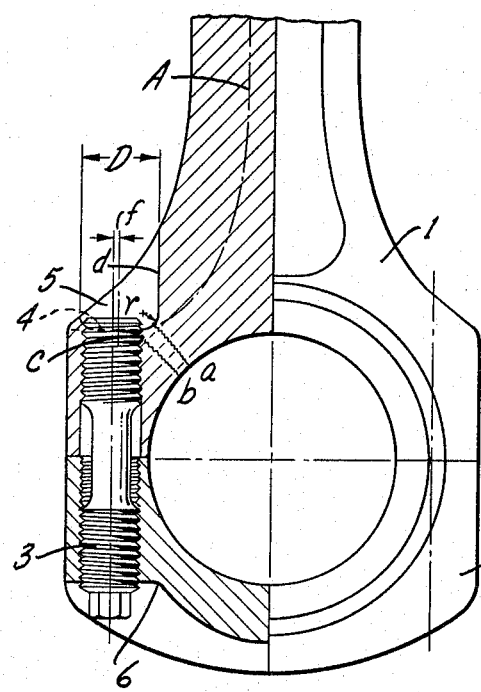
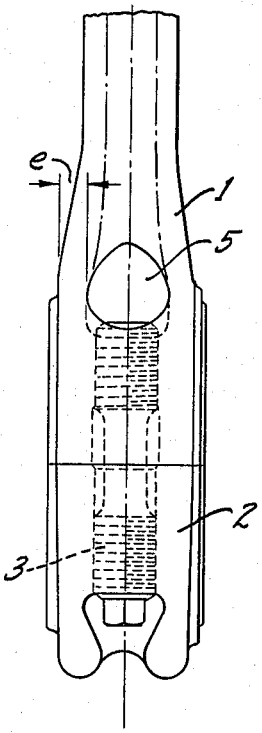
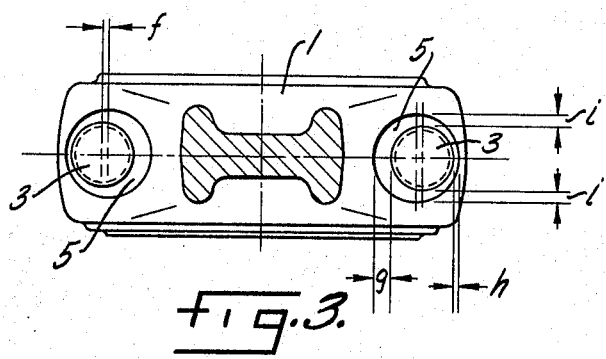

3,266,339
CONNECTING ROD
Ernst Schlechtendahl, Auf dem Sturren, Germany, assignor to Furstlich Hohenzollernsche Huttenverwaltung, Laucherthal, Germany
Filed Nov. 21, 1963, Ser. No. 325,259
Claims priority, application Germany, Nov. 28, 1962, F 38,409
9 Claims. (Cl. 74—579)

This invention concerns a connecting rod, especially of light metal or a light metal alloy with a bearing head in halves.

It has been conventional to connect the bearing halves through bolts and nuts, in this case, there have to be resting surfaces or pressure faces for the bolt heads and the nuts on both halves of the bearing. In this case, high stresses result at the points where the faces change into the rounded part of the bearing half. This can lead to breakage, especially with connecting rods of light metal such as aluminum, or a light metal alloy.

If simple head screws are used which are screwed into the thread borings of the bearing half of the connecting rod, the high stress of the pressure faces no longer exists or is diminished. When that is done, however, a high stress result in the first threads, that is, in the threads which lie at the outer ends of the conainuous thread borings or those furthest away from the bearing axis of the halves. The threads which are farther inside, that is, the ones positioned towards the parting line of the bearing halves are subject to less stress. The first threads of the screws are therefore severely strained in their grooves which can lead to breakage next to the screws.

The stress and breakage problems aforementioned are particularly disadvantageous when connecting rods are made of aluminum or light metal alloys. The use of light metals in connecting rods is desirable in order to reduce weight and attendant inertia forces found in the use of such rods. The major purpose of the invention is to overcome or minimize the aforementioned problems.

According to the invention, the bearing half of the connecting rod has at the outer end of the continuous thread borings, front surfaces which are arranged transversely to the bore axes and over which approximately one thread of the ends of connecting screws protrude, in order to avoid the disadvantages of the pressure faces of the nut and bolt connectors and the stress problems in conventional screw connectors.

Through use of these surfaces which, in a purely superficial view, are somewhat similar to the known arrangement of the pressure faces for bolts and nuts, the stress is distributed better and more equally to all threads.

On the cap or other bearing half section, the high stress through the pressure of screws heads on the pressure faces can be overcome by designing the cap with appropriate strength. However, this is not always possible for space reasons and for this case it has now become known to connect the two bearing halves with differential screws in which case the cap has thread borings also as in my United States Patent 2,990,218. In further accord with the invention, the outer ends of the thread borings of the cap may have front surfaces extending transversely to the bore axis also.

The principles of the invention may be simply accomplished by use of larger borings without threads and adjoining the thread borings of the connecting rod bearing half section. This larger boring should be at least 30% larger in diameter than the outer diameter of the screws.

Referring generally now to the drawings:

FIGURE 1 is a view of the split bearing head of a connecting rod, partially in section;

FIGURE 2 is a side view of FIGURE 1;

FIGURE 3 is a cross section of the connecting rod.

With specific reference now to the drawings which illustrate one embodiment of the invention, and in which like elements are designated by like characters throughout, the bearing half 1 of the connecting rod is screwed to the other bearing half section or cap 2, with two differential screws 3 in the known manner as in my United States Patent 2,990,218. On the rod side, the outer contour of the bearing half 1 runs, as conventionally in a convex curved line. Prior to this invention, the thread boring for the differential screw 3 has been tapped continuously up to this curved line.

According to the invention, front surfaces 4 are provided transversely to the boring axes of the bores in the connecting rod bearing section whereby the boring is shortened accordingly.

The front or outwardly facing surfaces 4 are created by means of a recess which is easily provided by a larger borings 5 without threads. These may be made by means of a screw-tap or a countersink. The diameter of these borings 5 which open toward the outside of the bearing half 1, is at least 30% larger than the outer diameter of the differential screws 3.

The longitudinal axis of each boring 5 which is parallel to the axis of the thread boring, is offset from the thread boring axis by a certain distance $f$ toward the longitudinal axis of the connecting rod.

At the merger of the front surfaces 4 with the inner walls of their borings 5 is a good round surface $r$. The radius of this surface should be at least 15% of the diameter of the larger borings 5.

Each differential screw 3 is adjusted in the thread borings in the two bearing halves in such a way that its two ends protrude from the thread borings by approximately one thread. The continuous breakages which occur at the upper thread when aluminum connecting rods are severely strained are avoided through the front surfaces 4, respectively, of the boring 5 or the cutting. According to experience and experiments, it appears that the endangered point of the bolted joint is the one which is nearest to the connecting rod bore, but it is not the line $a$ as one would assume, but line $b$ starting from the top thread $c$ of the bore for the screw. The balancing of the upper thread $c$ at this point is the more effective the farther the wall line $d$ of the bore 5 is away from the center line of the differential screw. Here, it is effected through the size of the roundcut $r$, that a breakage along the line $a$ cannot occur in spite of the bore 5 and the resulting balancing at point $c$. The distance of the wall line $d$ cannot be increased to any extent through an increase of the diameter D of the boring 5 since the stud $e$ (FIGURE 2) would thereby be weakened again when rods are made in the general proportions illustrated. For this reason one does not increase the diameter D but the boring is offset by the distance $f$. Thus through this offset, the distance of the wall line $d$ from the center of the screw is greatest in that area in which the greatest stress exists, that is toward the center of the shaft (as represented by the distance $g$, FIGURE 3) and that the shortest distance is there, where, according to experience, there are no tensions at all, that is toward the outside (as represented by the distance $h$, FIGURE 3). The problem is to meet this demand not only at $g$ (FIGURE 3) but also to reach a certain distance at $i$ (FIGURE 3) without weakening the stud $e$ too much. The particular sizing, configuration and position of the bores 5, as described herein meets this problem.

On the cap or other bearing half section 2, appropriate front surfaces 6 are provided where the threads of the differential screw 3 protrude, the screws protruding from these front surfaces 6 also by one thread.

The front surfaces 4 and 6 may also be made with a side-milling-cutter which works from the side as is indicated in FIGURE 1 through the line A in small lines and dots. In this cutting, the I-profile of the rod cross section (FIGURE 3) may be turned by 90° so that the cutting crosses approximately into the stud of the I-profile.

The front surfaces 4 and 6 do not have to be precisely perpendicular to the axes of the thread bores but may have an inclination toward the thread which must not be larger than half the flank angle of the screw thread (at 60° flank angle, —30°).

The front surfaces may be hammered when the connecting rod is made.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. A connecting rod including a connecting rod body having a bearing half section at one end of a rod portion thereof, a complementary bearing half section, means connecting said two half sections together, said means including differentially threaded screws passed through aligned bores in said bearing half sections, said screws being in screw-threaded relation within the bores of said first-named bearing half section, said screws each having threaded end portions protruding beyond the ends of the bores closest to said rod portion, said first-named half section having outwardly open recesses at opposite sides of said rod portion said recesses terminating in surfaces extending from said bores, generally transversely of the axes of said bores and toward the axis of said rod portion, said recesses being in the general form of bores with axes extending parallel to said first-named bores.

2. A connecting rod as in claim 1 wherein said recesses are at least thirty percent larger in diameter than the outer diameter of said screws.

3. A connecting rod as set forth in claim 1 wherein the axes of said recesses are located between the axes of said bores and the longitudinal axes of said rod portion.

4. A connecting rod as set forth in claim 1 wherein each said recess terminates in a surface extending generally transversely to said axes and the wall portion of the recess closest to said rod portion merges into said surface through a radius which is at least fifteen percent as large as the diameter of said recesses.

5. A connecting rod as set forth in claim 1 wherein said screws are in screw-threaded relation with the bores in each of said bearing halves.

6. A connecting rod as set forth in claim 1 wherein said recesses are defined by wall portions which are hammered.

7. The structure of claim 1 wherein said first-named bearing half section includes surfaces at the juncture of said recesses and bores, which surfaces are inclined toward the threads at half of the angle of the flanks of the screws.

8. A connecting rod as set forth in claim 1 wherein differential screws are used to connect each of the said bearing half sections and in screw-threaded engagement with each said half section, with second named bearing half section having outwardly open channels therein with the inner surfaces of said channel intersecting said bores, said screws protruding outwardly of said surface.

9. A connecting rod as set forth in claim 1 wherein each screw protrudes beyond its bore by approximately one thread.

References Cited by the Examiner

FOREIGN PATENTS 834,624 7/1949 Germany.
825,329 12/1959 Great Britain.

OTHER REFERENCES

Metal Progress (Research Lab. Div., General Motors Corporation) May 1943, page 737, by Almen.

FRED C. MATTERN, JR., *Primary Examiner.*

BROUGHTON G. DURHAM, MILTON KAUFMAN, *Examiners.*

W. S. RATLIFF, JR., *Assistant Examiner.*